Figure 1:
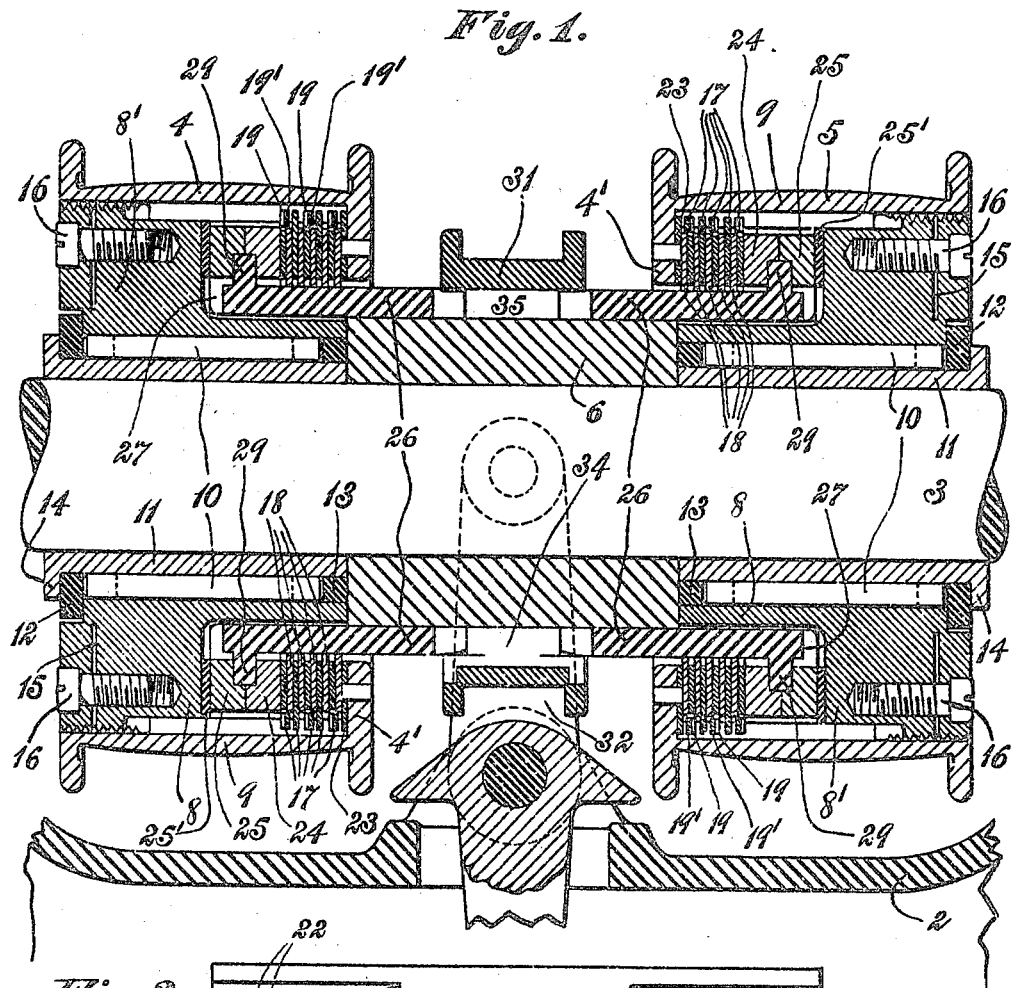

C. L. GROHMANN.
CLUTCH MECHANISM.
APPLICATION FILED AUG. 11, 1909.

948,695.

Patented Feb. 8, 1910.

2 SHEETS—SHEET 1.

Witnesses:

Inventor:
C. L. Grohmann
By his Attorneys,
Sutherland & Anderson

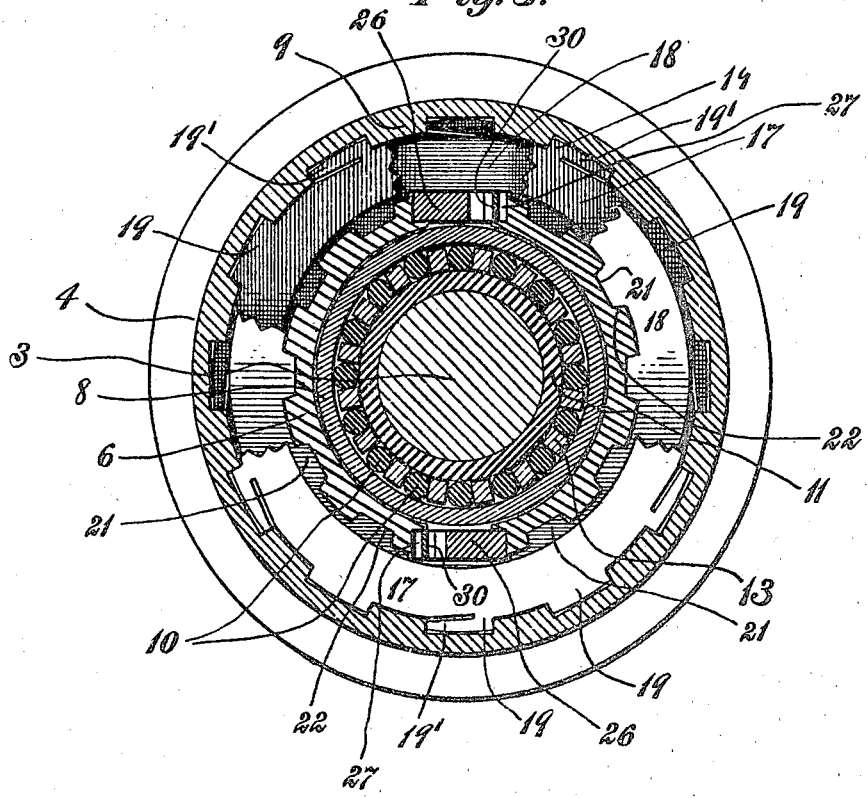
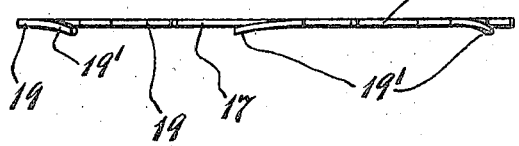

UNITED STATES PATENT OFFICE.

CARL L. GROHMANN, OF HARTFORD, CONNECTICUT, ASSIGNOR TO PRATT & WHITNEY COMPANY, OF HARTFORD, CONNECTICUT, A CORPORATION OF NEW JERSEY.

CLUTCH MECHANISM.

948,695.

Specification of Letters Patent. Patented Feb. 8, 1910.

Application filed August 11, 1909. Serial No. 512,319.

*To all whom it may concern:*

Be it known that I, CARL L. GROHMANN, a citizen of the United States, residing at Hartford, in the county of Hartford and State of Connecticut, have invented certain new and useful Improvements in Clutch Mechanism, of which the following is a specification.

This invention relates to clutch-mechanism. Clutch-mechanism involving my invention can be employed with advantage in many different connections although it is of particular utility when employed in conjunction with or forming part of an automatic screw-machine, where I find that notwithstanding the excessive speeds at which it is necessary to drive the work-spindle I can efficiently effect reversal of said spindle without undue wear on said clutch-mechanism or impairing the action thereof.

There are several salient features of the clutch mechanism and these may be used conjointly or separately. One point is a desirable manner of clamping together the friction-rings or as they are sometimes known " disks." Another point is the wide range of adjustability by virtue of which I can take up wear until these rings or disks are reduced to the minimum amount of thinness. Still another point is the thrusting of the group of rings against one of the principal elements of the clutch and not against a bearing part independent of the clutch by reason of which excessive wear is eliminated.

There are other advantageous features which with the foregoing will be set forth at length in the following description wherein I outline in detail that form of embodiment of the invention which I have selected for illustration in the drawings accompanying and forming part of the present specification.

The novelty of the invention will be included in the claims succeeding said description and I might state now that certain variations may be adopted within the scope of my invention as expressed by said claims.

Figure 2:
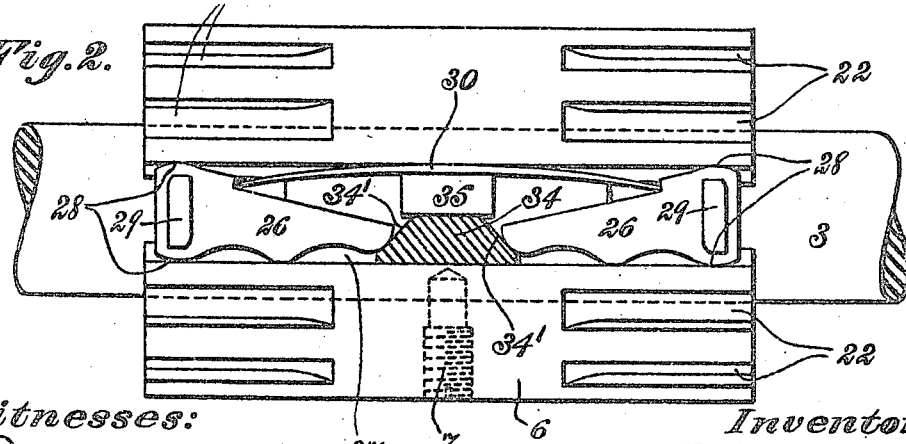

Referring to said drawings, Figure 1 is a longitudinal sectional view of clutch-mechanism including my invention. Fig. 2 is a top plan view of one of the main elements of the clutch-mechanism and the levers and certain adjunctive devices. Fig. 3 is a cross section through one of the pulleys, and, Fig. 4 is a detail view in edge elevation of a ring or disk hereinafter more particularly described.

Like characters refer to like parts throughout the several figures.

As hereinbefore indicated the clutch-mechanism is of particular advantage when employed in connection with or forming part of an automatic screw-machine and in Fig. 1 of the drawings I have represented portions of such a machine such as the base or bed 2 and the work-spindle 3 and it is the latter which is reversed through the agency of the clutch mechanism. There are it might be considered two clutches and each comprises two main members although as will be hereinafter obvious one of these main members is common to two clutches. One of these clutches includes a pulley as 4 and the other a pulley as 5 which in the present instance are main members of the two clutches while the sleeve 6 is also a main member common to both the pulleys 4 and 5 as it is this member or sleeve 6 which alternately clutches the pulleys 4 and 5 to the supporting spindle or shaft 3, through the intervention of suitable means as will hereinafter appear. The sleeve 6 in the present case is fastened to the shaft or spindle 3 and for this purpose I have shown a screw 7. The two pulleys therefore are loosely carried by said spindle. I will describe in detail the mounting and internal construction of one of these pulleys, for instance the pulley 4 and such description will apply to the other wherein like parts will bear similar identifying symbols. The pulley 4 is composed of two sections 8 and 9 which are adjustably connected together the section 8 constituting the body of the pulley and the other section the rim portion the latter being driven by a belt as usual although from what has been stated this relation might be reversed. That is to say the part 6 instead of the pulley might be the driving element of the clutch.

The section 8 is made substantially in the form of a sleeve and is partially telescoped or inclosed by the sleeve or fixed clutch member 6 as shown in Fig. 3. Said section 8 incloses and runs on several rollers as 10 supported upon an inner sleeve as 11 which is usually fastened to the spindle 3 for example by being driven thereonto. Said rollers are held in place and against endwise movement by two cages as 12 and 13, the body of the cage 12 fitting in a counterbore in the section 8 and against the outer collar 14. The body of the inner cage also encircles the fixed sleeve 11 and is inclosed by the section 8. It will be clear that when the pulley 4 is connected with the sleeve 6 the said pulley will be put into driving relation with the spindle 3. It is usual to drive the two pulleys in reverse directions by means of straight and crossed belts (not shown) although it is conceivable that the parts 4 and 5 need not necessarily be in pulley form nor is it essential that they both be present in an organized apparatus.

The web portion 8' of the pulley section 8 is shown as having a radial slit or kerf 15 and this slit or kerf is shown as intersected by several screws 16 although one only might be employed said screw being tapped into the inner part of said web 8' by reason of which a clamping action as will be hereinafter apparent can be secured.

The section 8 of the pulley is threaded into the rim portion 9 thereof so that adjustability of said body section 8 can be obtained the adjustment being positively maintained by the screws 16 which press the practically resilient or outer part or that outside the slit or kerf into binding engagement with the threaded portion of the rim section 9. Prior to adjusting the section 8 these screws will be run out so that the said section can be easily run in or out and when the adjustment has been made the clamping screws 16 will be run in to hold the adjustment. While the section 8 is adjustable it is normally stationary or fixed with respect to the rim section 9. As a matter of fact I do not actually run the section 8 into the rim portion but only relatively so, the adjustment being secured by the rotation of the rim portion 9. The clutching together of the pulley 4 and the sleeve 6 is secured in the present case by several rings or disks as 17 and 18 and while these rings may be of any desirable material I find that the rings 17 of which there is a series can best be of bronze while the series of rings 18 can be best made of steel. There may be any number of rings in each series. The rings 17 are shown as having on their peripheries, ears or lugs as 19, acting as keys, which fit into grooves or recesses, acting as keyways, in the inner surface of the rim portion of the pulley 4 this being a simple and convenient means for connecting said rings and pulley. The rings 18 have interiorly somewhat similar ears or lugs also acting as keys and denoted by 21. The said ears 21 fit grooves 22 extending longitudinally of the sleeve 6 thereby connecting the latter with the rings 18. When the two series of rings 17 and 18 are out of lateral contact there is an unclutched relation between the sleeve 6 and the pulley 4 but when said rings are brought into engagement or jammed together said pulley and sleeve are clutched together or put into driving relation. The extreme innermost ring 18 is shown as having a side engagement with a wear ring or member as 23 fastened to the rim portion 9 of the pulley 4. The extreme outermost ring 17 is represented as fitting against a ring 24 complemental to the ring 25 having contact with a wear ring as 25' fitted against the inner face of the web part 8'. In the present case the two series of rings are brought into clutching engagement by being pressed together from one side shown as being on the outer side and the thrust is so applied as to be received against two separate surfaces both on a common member which is in the present instance the pulley 4 but which of course might be the other main member of the clutch. This thrust is therefore divided but both surfaces which take up the thrust being on a common member there is no possibility of that wear which is occasioned when a clutch member is forced against a bearing part. For illustration if I were to force the pulley 4 against the collar 14 when the former is in motion excessive friction would occur and naturally great wear would take place but by receiving the thrust in the manner indicated none of these disadvantages is present. Then also there is what might be considered a reaction between the two areas at which the thrust is applied which secures a balancing effect.

Preferably the pressing together of the clutching rings or disks 17 and 18 is effected by a spreading of the two rings 24 and 25 the ring 25 being forced outward to a relatively fixed part or abutment which is in the fin portion 8' while the companion ring 24 as it is moved inward presses the several rings 17 and 18 together with a portion of the pulley (the flange 4') as an abutment for said rings the consequence being that there is a solid and firm engagement between said rings, the thrust being taken up approximately equally by the fin-portion 8' and the flange 4'. As the rings wear away from use I can compensate for such wear by the relative adjustment, which I have already described, of the two portions 8 and 9 of the pulley so that I find I can in practice utilize said rings until they are exceedingly reduced in thickness.

While I employ two diametrically opposite levers for spreading the rings 24 and 25 it is possible that I might only use one although the best results are secured with two and while said levers may take various forms those each designated by 26 answer my purpose. Said levers are fitted in slots 27 extending from end to end of the sleeve 6 and they have opposite rounded fulcrum or pivot portions 28 which bear against the side walls of said slot 27 which as will be understood receive the like levers for coöperation with the pulley 5. The levers move about axes extending radially of the sleeve 6 although from what has been stated this is not essential. The levers present an advantageous means of rigidly clamping the clutching rings 17 and 18 together; that is to say the rings are not clamped together with a yieldable force such as would be the case were a spring or equivalent means interposed in the ring clutching mechanism. The rocking levers 28 are shown as provided with approximately rectangular projections 29 at their outer ends or heads which fit a groove 30 formed by mating counterbores or rabbets in the inner adjacent sides of the coöperating rings 24 and 25 and it is therefore apparent when said levers 26 are turned or swung in the proper direction, which in the present case would be by moving the tail portions of the same upward in Fig. 2 the rectangular projections 29 will spread the rings 24 and 25 so as to secure the function hereinbefore set forth. In the present case I provide positive means for unclutching the rings 17 and 18 and this means may take various forms although springs such as will now be described answer effectively my purpose. It will be seen that alternate ears 19 are slit to produce tongues 19' which are resilient or springy and which are bent sidewise to engage against the uncut lugs 19 of adjacent rings so that when the clamping pressure is removed from the two series of rings they are spread apart by said spring tongues 19'. I could of course dispense with these spring tongues or any other means which might be employed to positively separate the rings.

There are as will be understood on the sleeve 6 two opposite pairs of levers 26 those of each pair being longitudinally alined as shown best in Fig. 2 and the longitudinally alined levers are normally held in their ineffective positions in some suitable manner, for example by a bowed spring as 30 the opposite free ends of which bear against shoulders on said longitudinally alined levers for the purpose indicated. The springs between their ends bear against the walls of the slots 27. The sleeve 6 is shown as surrounded by the slidable ring 31 which is moved back and forth by the bifurcated lever 32 which may be either manually or automatically operated. In the case of an automatic screw machine the lever 32 would be automatically operated and I use a cam (in practice) for this purpose although said lever might be otherwise automatically oscillated. Within said ring 31 and suitably rigidly connected therewith are diametrically opposite blocks 34 having end angular faces 34' to constitute wedges and which are respectively guided by a wall of the slots 27 and the square blocks 35. Said wedge blocks 34 move or slide in the direction of the axis of motion of the spindle 3 and they are shown as occupying their neutral positions in Figs. 1 and 2. When the said blocks 34 are moved to the left in said two figures the two coöperating levers 26 on the left which coact with the pulley 4 will spread the coacting rings 24 and 25 to connect the pulley 4 with the spindle 3 and when said blocks are moved again to their neutral position said pulley 4 will be unclutched from said spindle and during this action the springs 19' will positively separate the rings 17 and 18 and at the same time the springs 30 will move the levers 26 on the left to their original and ineffective position. Movement of the wedge blocks 34 to the right from their said neutral or intermediate positions will of course clutch the pulley 5 to said spindle 3.

What I claim is:

1. A clutch comprising two main members, a plurality of rings connected respectively with the main members, a pair of spreading rings having a bearing against one of the main members, and said plurality of rings also having a bearing against the same main member, and a lever to enter between said spreading rings for separating the same to thereby press the plurality of rings into clutching relation.

2. A clutch comprising two main members, a plurality of rings connected with the respective main members, a pair of rings having complemental rabbets to present a groove, and a rocking lever having a projection to enter said groove to thereby spread said pair of rings the latter when spread serving to press the plurality of rings together to clutch said main members to each other.

3. A clutch comprising two main members, a plurality of rings connected with the respective main members, a pair of rings having mating rabbets to present a groove, and a rocking lever having a substantially rectangular projection to enter said grooves for unyieldingly spreading said pair of rings the latter when spread acting to press said plurality of rings together for clutching said main members to each other.

4. A clutch comprising two main members, a plurality of rings connected with the respective main members, a pair of spreading rings having a seat, and a swinging lever provided with a substantially rectangular portion to enter said seat and which is adapted on the swing of said lever to separate said spreading rings and the latter when spread serving to press the plurality of rings into contact.

5. A clutch comprising two main members, a plurality of rings connected with the respective main members and inclosed by one of them, and a lever inclosed by said rings and supported for rocking motion by the other main member said lever when rocked serving to unyieldingly press the rings together for clutching said main members.

6. A clutch comprising two main members, a plurality of rings connected with the respective main members and inclosed by one of them the other member having a groove, and a lever mounted in said groove for swinging movement the lever being surrounded by and adapted to unyieldingly press said rings together to clutch said main members.

7. A clutch comprising a pulley, a sleeve having a longitudinal groove, a series of rings inclosed by the pulley and connected with said pulley and sleeve, respectively, a pair of rings fitted against said pulley and bearing against said series of rings the latter also bearing against said pulley and said pair of rings having a seat therebetween, and a lever mounted for swinging movement in said groove and having a projection to enter said seat, adapted when the lever is swung to spread said pair of rings to thereby press said series of rings together for clutching the pulley and sleeve to each other.

In testimony whereof I affix my signature in presence of two witnesses.

CARL L. GROHMANN.

Witnesses:
B. M. W. HANSON,
CHAS. E. HOLT.